Jan. 14, 1964 — B. C. PHILLIPS — 3,118,009
CHARGE FORMING AND FUEL FEEDING APPARATUS
FOR INTERNAL COMBUSTION ENGINES
Filed May 2, 1960 — 7 Sheets-Sheet 1
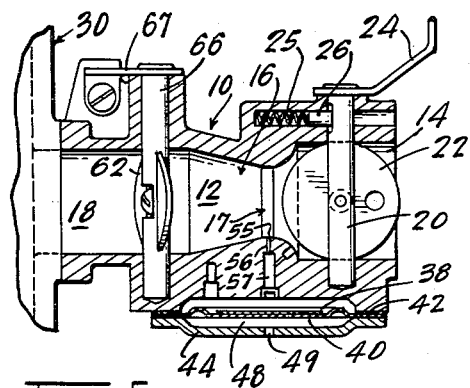
FIG-5-
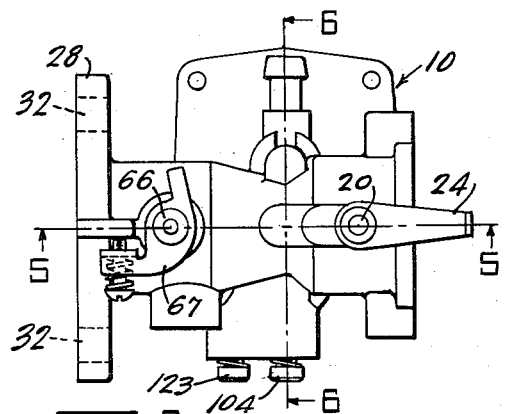
FIG-2-
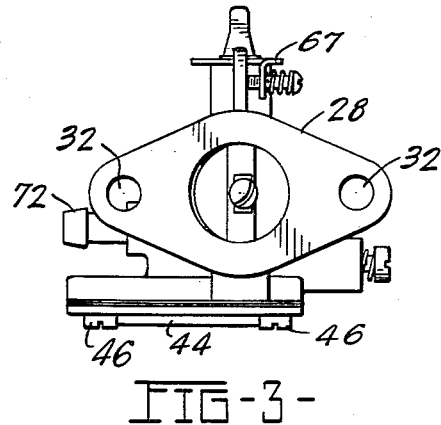
FIG-3-
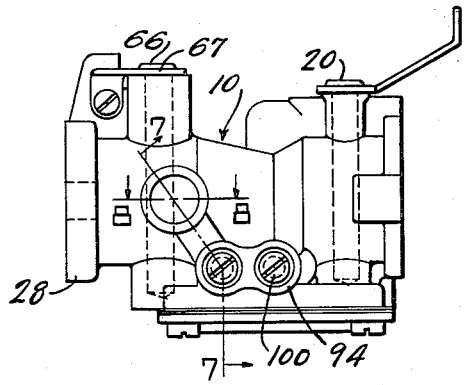
FIG-1-
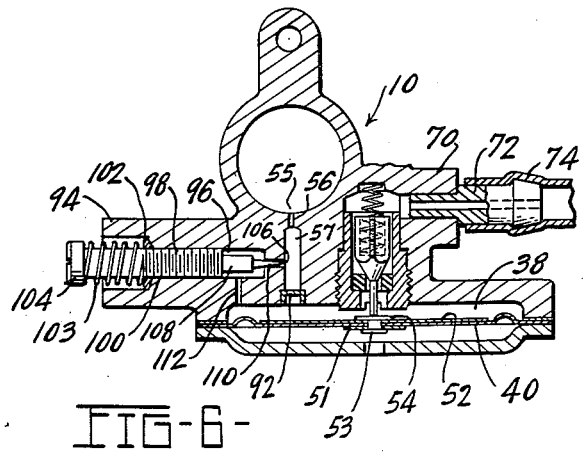
FIG-6-
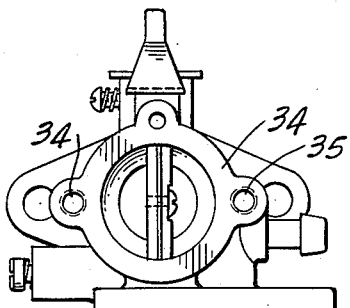
FIG-4-
INVENTOR:
BERNARD C. PHILLIPS.
BY
Harry O. Ernsberger
ATTY.

Jan. 14, 1964　　　B. C. PHILLIPS　　　3,118,009
CHARGE FORMING AND FUEL FEEDING APPARATUS
FOR INTERNAL COMBUSTION ENGINES
Filed May 2, 1960　　　　　　　　　　　7 Sheets-Sheet 2
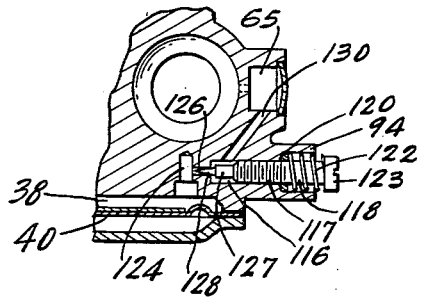
FIG-7-
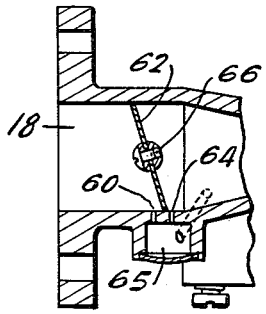
FIG-8-
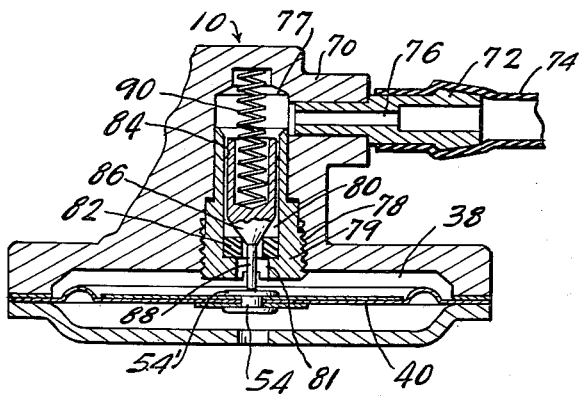
FIG-9-
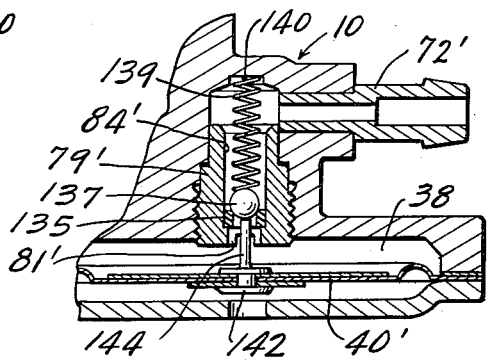
FIG-10-
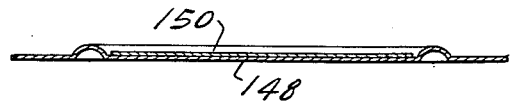
FIG-11-
INVENTOR:
BERNARD C. PHILLIPS.
BY
Harry O. Ernsberger
ATTY.

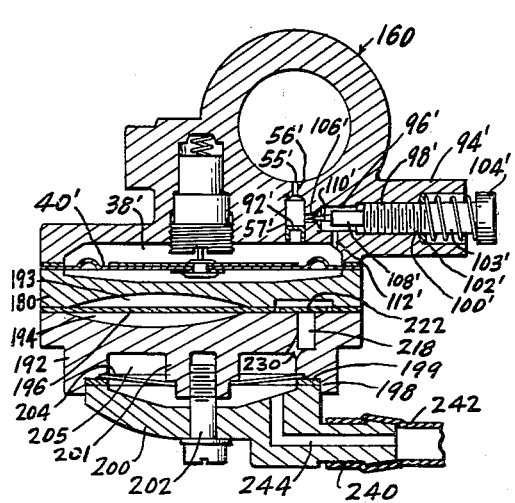
FIG-15-
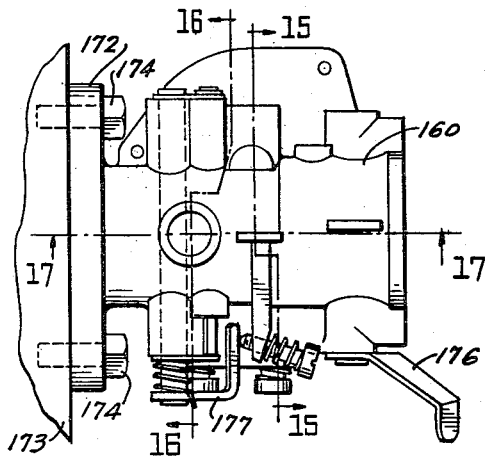
FIG-13-
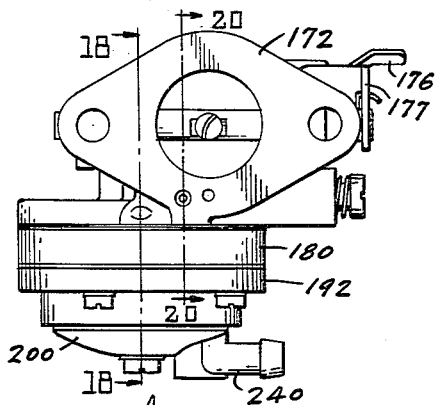
FIG-14-
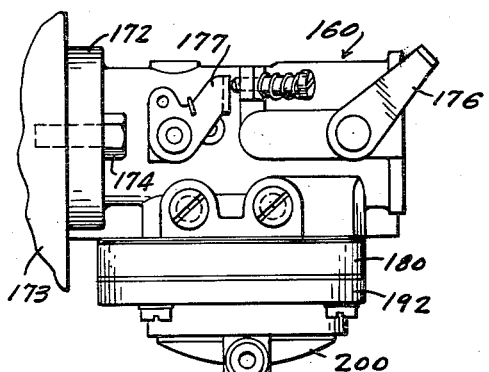
FIG-12-
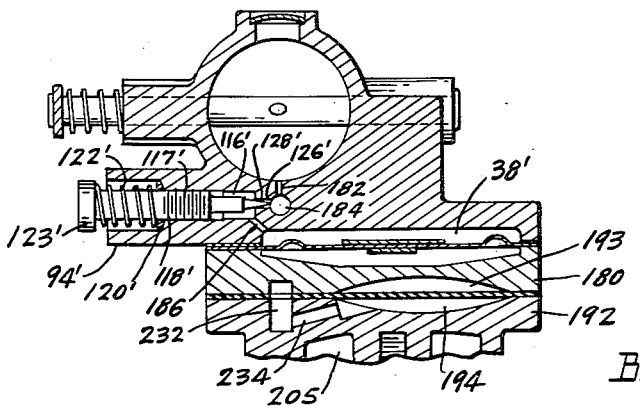
FIG-16-
INVENTOR:
BERNARD C. PHILLIPS.
BY
Harry O. Ernsberger
ATTY.

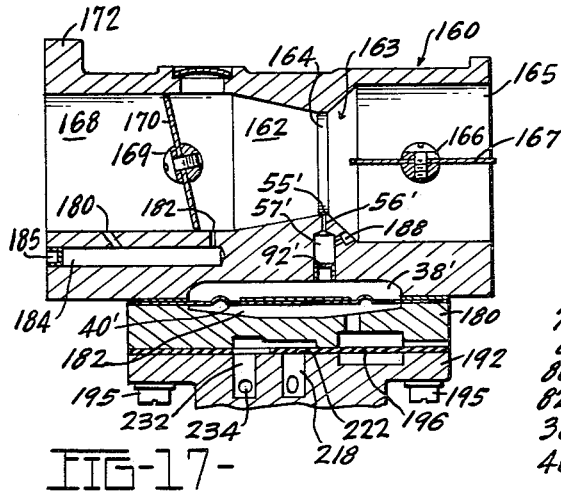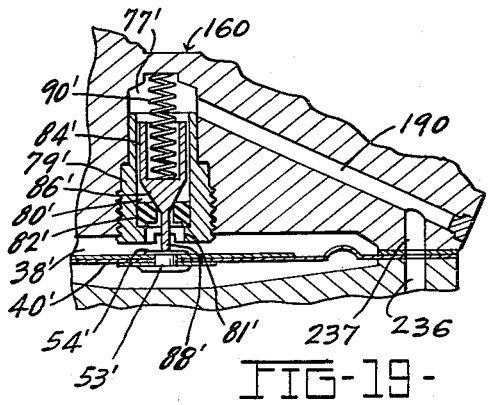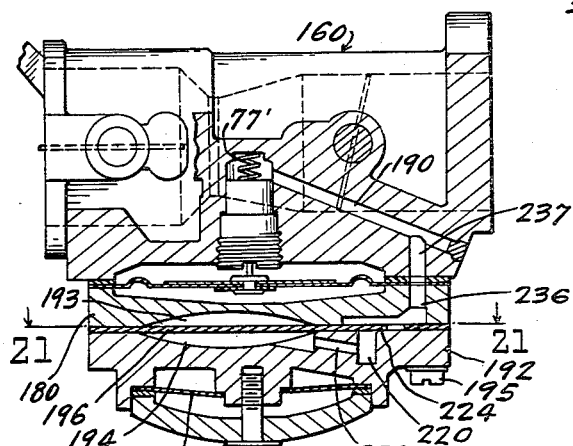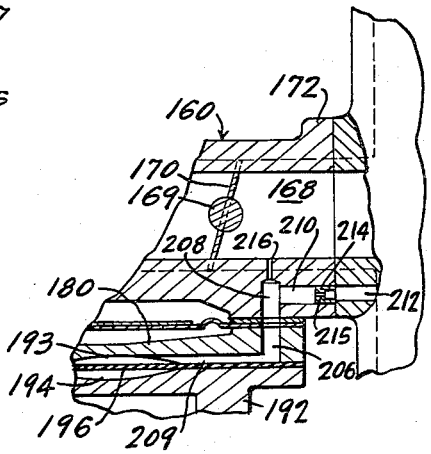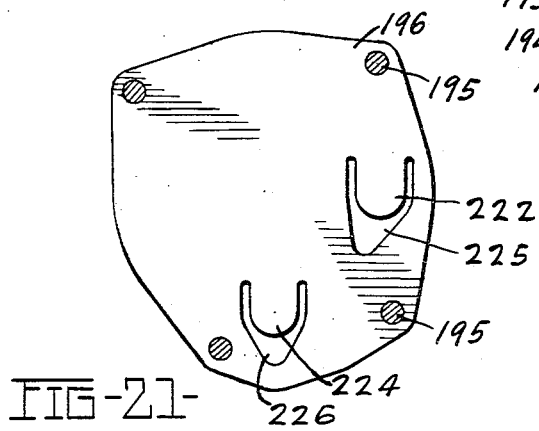

Jan. 14, 1964
B. C. PHILLIPS
3,118,009
CHARGE FORMING AND FUEL FEEDING APPARATUS
FOR INTERNAL COMBUSTION ENGINES
Filed May 2, 1960
7 Sheets-Sheet 5
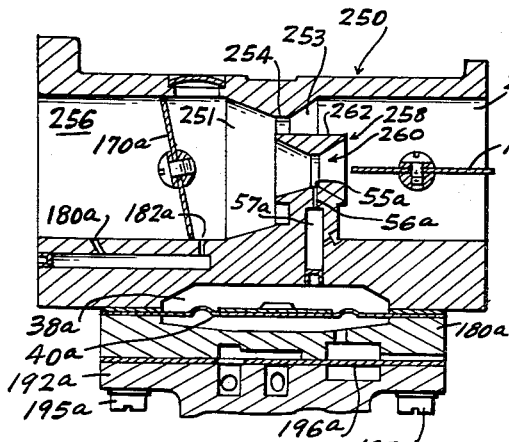
FIG-22-
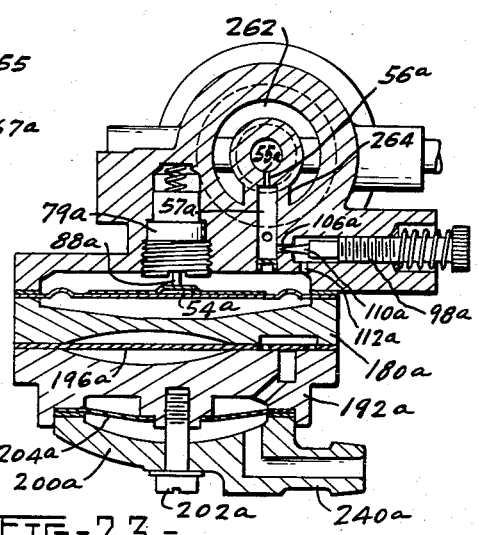
FIG-23-
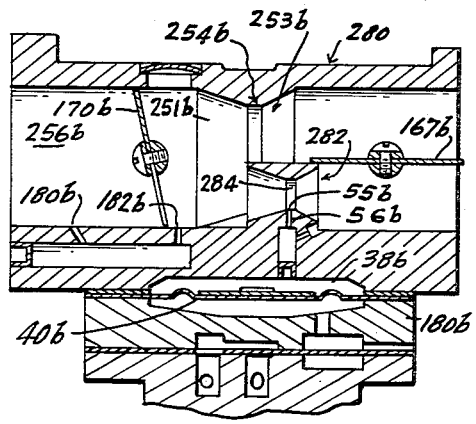
FIG-24-
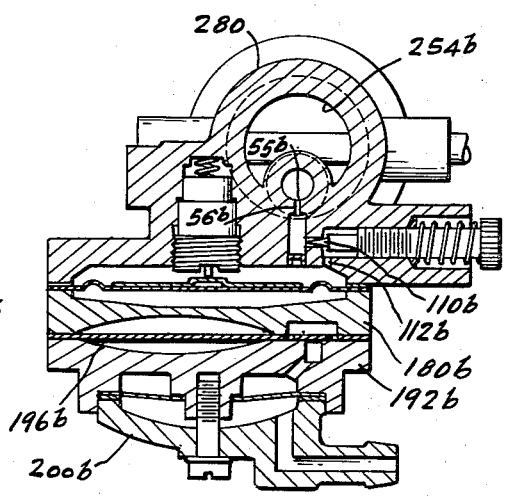
FIG-25-
INVENTOR:
BERNARD C. PHILLIPS.
BY
Harry C. Ernsberger
ATTY.

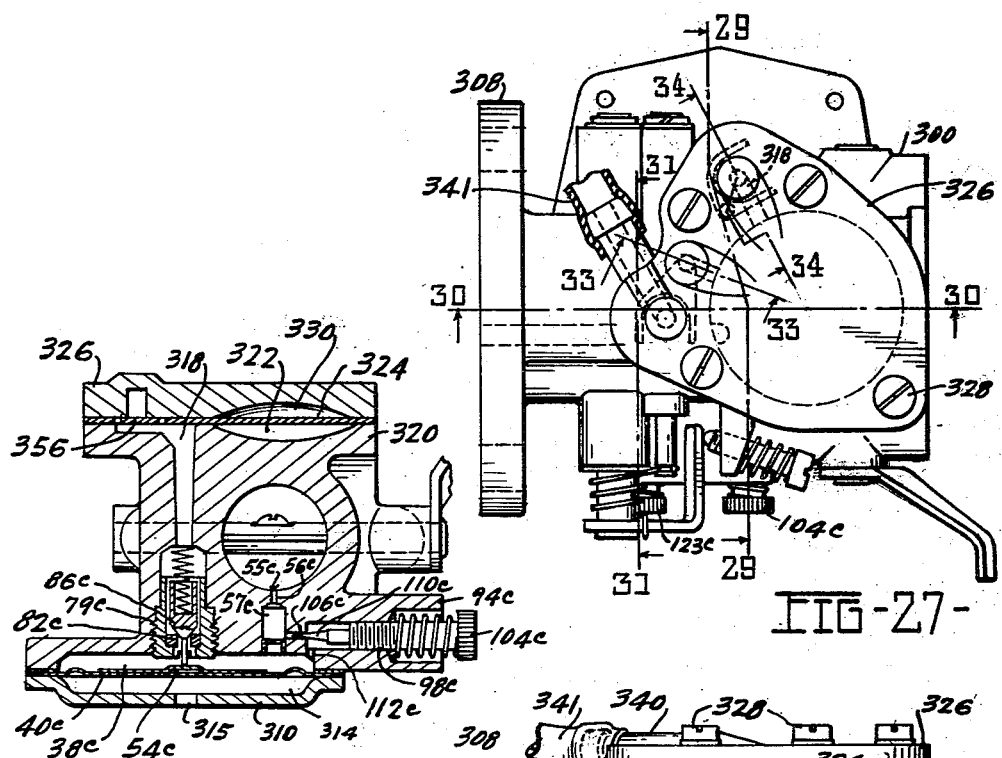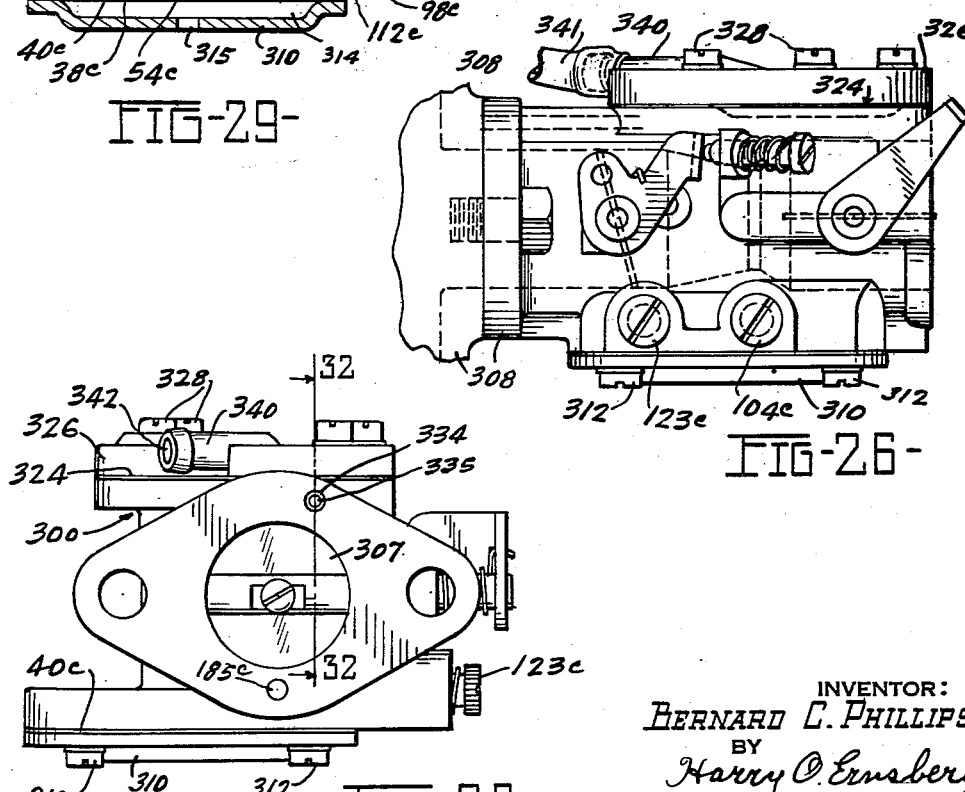

Jan. 14, 1964     B. C. PHILLIPS     3,118,009
CHARGE FORMING AND FUEL FEEDING APPARATUS
FOR INTERNAL COMBUSTION ENGINES
Filed May 2, 1960                              7 Sheets-Sheet 7
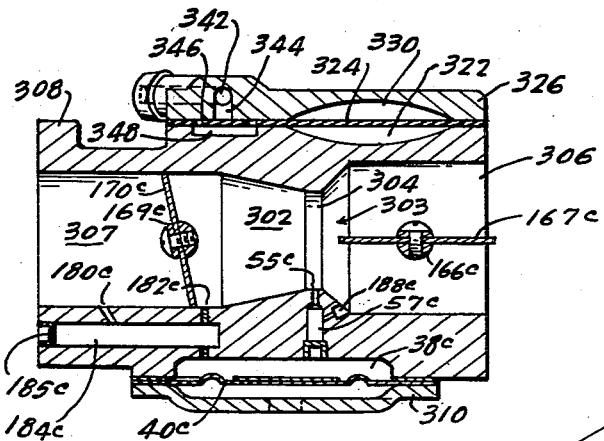
FIG-30-
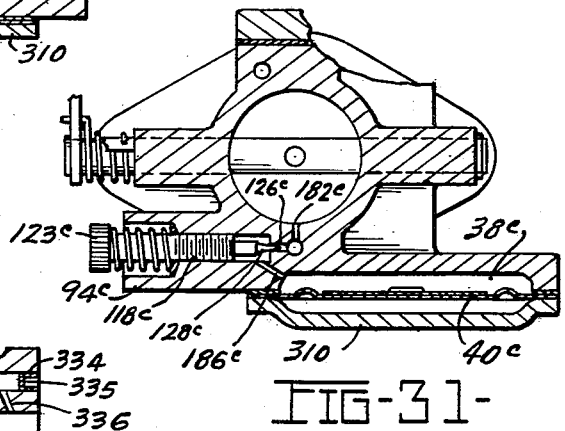
FIG-31-
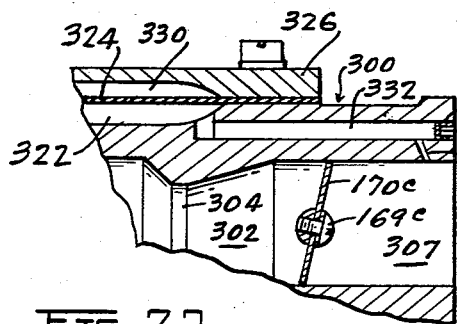
FIG-32-
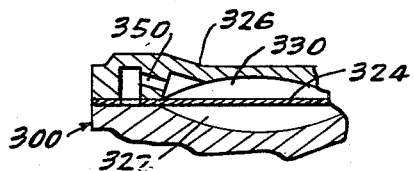
FIG-33-
FIG-34-
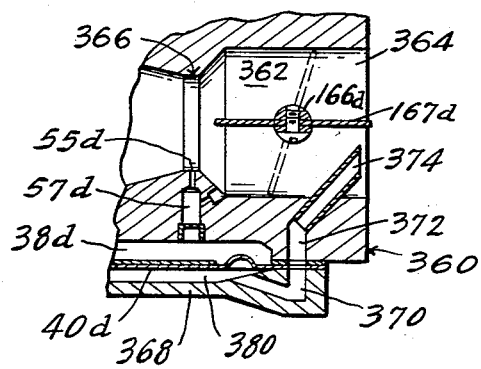
FIG-35-
INVENTOR:
BERNARD C. PHILLIPS.
BY
Harry O. Ernsberger
ATTORNEY

United States Patent Office 3,118,009
Patented Jan. 14, 1964

3,118,009
CHARGE FORMING AND FUEL FEEDING APPARATUS FOR INTERNAL COMBUSTION ENGINES
Bernard C. Phillips, Toledo, Ohio, assignor to The Tillotson Manufacturing Company, Toledo, Ohio, a corporation of Ohio
Filed May 2, 1960, Ser. No. 26,150
8 Claims. (Cl. 261—35)

This invention relates to charge forming and fuel feeding apparatus or arrangement for supplying fuel and air mixture to an internal combustion engine and more particularly to a charge forming apparatus embodying a flexible diaphragm influenced or controlled by aspiration or reduced pressure in a mixing passage of the apparatus for automatically regulating the delivery of fuel from a supply into the mixing passage in accordance with the requirements of the engine.

Charge forming devices or carburetors of the diaphragm type have been employed with internal combustion engines and especially where an engine is adapted to be operated in tilted or angular positions as the diaphragm is not appreciably affected by gravity and therefore affords more sensitive control of delivery of fuel into a mixing passage.

Charge forming apparatus or carburetors of the diaphragm type which have been commercially satisfactory have employed a lever or motion multiplying means arranged between the diaphragm and a fuel inlet valve of the charge forming apparatus whereby flexure of the diaphragm under the influence of aspiration or reduced pressure in the mixing passage is transmitted through the motion multiplying means or lever to the fuel inlet valve, the latter regulating the flow of fuel into a diaphragm chamber for delivery into the mixing passage. An example of a carburetor of this character is disclosed in my Patent 2,841,372, granted July 1, 1958.

The present invention embraces a carburetor or charge forming apparatus of the diaphragm type wherein the diaphragm movement is transmitted directly to a fuel inlet control valve without any intermediate or motion multiplying means and is adapted for use with a fuel supply or fuel head of comparatively low pressure.

Another object of the invention is the provision of a charge forming apparatus embodying a diaphragm actuated fuel flow control means wherein the diaphragm is responsive to minute variations in pressure in the mixing passage whereby the proper rate of fuel delivery into the mixing passage is attained to provide a satisfactory combustible mixture delivered to the engine at all engine speeds.

Another object of the invention is the provision of a charge forming apparatus or carburetor of the diaphragm type wherein the diaphragm is arranged to control a fuel inlet valve without intermediate motion multiplying or lever means, the carburetor being formed with fuel delivery channels opening into the mixing passage for engine idling, low speed and high speed engine operation whereby the high speed fuel delivery system embodies a restricted zone or zones in which the liquid fuel provides a valve means, barrier or capillary seal adapted to prevent air bleeding through the high speed fuel delivery system into the low speed and engine idling fuel delivery system when the latter system is in operation.

Another object of the invention is the provision of a charge forming apparatus embodying a diaphragm arranged for direct actuation of a fuel inlet control valve and wherein fuel is delivered into the mixing passage solely by engine aspiration in a mixing passage, the charge forming apparatus embodying passages for conveying fuel through a main delivery system and a secondary fuel delivery system whereby liquid fuel in the main fuel delivery system establishes a liquid seal when the engine is operating under idling or low speed conditions avoiding back bleeding of air through the main fuel delivery system.

Another object of the invention resides in the provision of a diaphragm type carburetor wherein the metering diaphragm directly influences the position of a fuel inlet control valve especially adaptable for use where a low head of fuel is employed or where the pressure on the fuel at the region of the inlet valve is controlled and maintained at a minimum sufficient to assure closing of the valve when the metering diaphragm is flexed away from the valve.

Another object is the provision of a charge forming and fuel feeding apparatus embodying a metering diaphragm arranged for direct actuation of a fuel inlet control valve and a pumping diaphragm arranged to be actuated by a source of varying fluid pressure to establish a low pressure on the liquid fuel supplied to the region of the inlet valve, the arrangement embodying means for controlling the effectiveness of varying fluid pressure on the pumping diaphragm to regulate the pressure on the fuel supplied to the region of the inlet control diaphragm.

Another object of the invention is the provision of a charge forming apparatus embodying a metering diaphragm for liquid fuel arranged to act directly on a fuel inlet control valve under the influence of aspiration in a fuel and air mixing passage in conjunction with a multiple Venturi in the mixing passage for amplifying the effectiveness of the aspiration in the mixing passage on the metering diaphragm to provide greater sensitivity of control of fuel delivery into the mixing passage.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of a carburetor or charge forming apparatus of the invention;

FIGURE 2 is a top plan view of the carburetor shown in FIGURE 1;

FIGURE 3 is an elevational view of one end of the carburetor shown in FIGURE 1;

FIGURE 4 is an elevational view of the opposite end of the carburetor;

FIGURE 5 is a longitudinal sectional view taken substantially on the line 5—5 of FIGURE 2;

FIGURE 6 is a transverse sectional view taken on the line 6—6 of FIGURE 2;

FIGURE 7 is a fragmentary detail sectional view taken substantially on the line 7—7 of FIGURE 1;

FIGURE 8 is a detail sectional view taken substantially on the line 8—8 of FIGURE 1;

FIGURE 9 is a fragmentary enlarged sectional view of a portion of FIGURE 6 illustrating a form of fuel inlet valve;

FIGURE 10 is a view similar to FIGURE 9 showing a modified form of inlet valve construction;

FIGURE 11 is a sectional view of a diaphragm illustrating a modified form of reinforcement therefor;

FIGURE 12 is an elevational view of a combined charge forming and fuel feeding apparatus of the invention;

FIGURE 13 is a top plan view of the arrangement shown in FIGURE 12;

FIGURE 14 is an end elevational view of the construction shown in FIGURE 12;

FIGURE 15 is a transverse sectional view taken substantially on the line 15—15 of FIGURE 13;

FIGURE 16 is a transverse sectional view taken substantially on the line 16—16 of FIGURE 13;

FIGURE 17 is a longitudinal sectional view taken substantially on the line 17—17 of FIGURE 13;

FIGURE 18 is a sectional view taken substantially on the line 18—18 of FIGURE 14;

FIGURE 19 is an enlarged fragmentary sectional view of a portion of the construction shown in FIGURE 18;

FIGURE 20 is a fragmentary detail sectional view taken substantially on the line 20—20 of FIGURE 14;

FIGURE 21 is a sectional view taken substantially on the line 21—21 of FIGURE 18;

FIGURE 22 is a longitudinal sectional view illustrating a modified form of mixing passage embodying a multiple Venturi arrangement;

FIGURE 23 is a transverse sectional view through the construction shown in FIGURE 22;

FIGURE 24 is a longitudinal sectional view similar to FIGURE 22 illustrating another form of multiple Venturi arrangement in a mixing passage;

FIGURE 25 is a transverse sectional view through the construction shown in FIGURE 24;

FIGURE 26 is an elevational view of a modified form of charge forming and fuel feeding apparatus of the invention;

FIGURE 27 is a top plan view of the construction illustrated in FIGURE 26;

FIGURE 28 is an end elevational view of the arrangement shown in FIGURE 26;

FIGURE 29 is a sectional view taken substantially on the line 29—29 of FIGURE 27;

FIGURE 30 is a longitudinal sectional view taken substantially on the line 30—30 of FIGURE 27;

FIGURE 31 is a sectional view taken substantially on the line 31—31 of FIGURE 27;

FIGURE 32 is a detail sectional view taken substantially on the line 32—32 of FIGURE 28;

FIGURE 33 is a fragmentary sectional view taken substantially on the line 33—33 of FIGURE 27;

FIGURE 34 is a fragmentary detail sectional view taken substantially on the line 34—34 of FIGURE 27; and FIGURE 35 is a fragmentary detail sectional view showing a modified form of venting means for the chamber exterior of the metering diaphragm.

While the apparatus of the present invention has particular utility for delivering a combustible mixture to an internal combustion engine of the two cycle type, it is to be understood that the apparatus of the invention may be employed with four cycle engines. The apparatus of the invention provides a compact arrangement for delivering fuel and air mixture particularly for low horsepower engines of the character utilized for powering lawnmowers, chain saws, marine motors or wherever a high tilt tolerance charge forming apparatus is necessary or desirable.

With particular reference to the arrangement illustrated in FIGURES 1 through 9, the apparatus or charge forming device for delivering a fuel and air mixture to an engine is inclusive of a body or member 10 formed with an air flow or mixing passage 12. The mixing passage includes an air inlet region 14, a Venturi 16 having a choke band or a region of maximum restriction 17 and a mixture outlet region 18.

Extending transversely through the air inlet region 14 and journaled in suitable bores formed in the body member 10 is a shaft 20 supporting a disk type valve 22 providing a choke valve or means for restricting air flow through the mixing passage particularly for use in starting the engine with which the charge forming apparatus may be utilized. A portion of the shaft 20 extending exteriorly of the member 10 is provided with an arm 24 for manipulating the choke valve 22. The body member 10 is provided with a bore accommodating an expansive coil spring 25 which biases a plunger 26 into frictional engagement with the shaft 20 for retaining the choke valve 22 in an adjusted position.

The body or member 10 is provided with a mounting flange 28 adapted to be secured to a wall of an engine crankcase 30 of a two cycle type, or with the intake manifold of an engine of the four cycle type. The flange 28 is provided with openings 32 to receive bolts for securing the body 10 to a crankcase or a manifold. The inlet region 14 of the body 10 is provided with a flange 34 having openings 35 to accommodate means for securing an air cleaner or air filter (not shown) to the body.

The body member 10 is fashioned with a shallow circular recess 38 which provides a liquid fuel receiving chamber. Extending across the recess or chamber 38 is a flexible member, diaphragm or membrane 40 which forms one wall of the chamber 38. An annular gasket 42 is disposed between the peripheral region of the diaphragm and the adjacent portion of the body member defining the chamber 38. The diaphragm 40 and sealing gasket 42 are maintained in assembled relation to the body 10 by a closure 44 secured by screws 46 extending into bores formed in the body 10.

The central region of the cover or closure 44 is recessed providing a clearance space or chamber 48 to accommodate flexing movements of the diaphragm 40, the space 48 being vented to the atmosphere through an opening 49. The body 10 may be formed of cast metal or molded resinous plastic of a character resistant to the effects of hydrocarbon liquid fuels. The closure member 44 may be fashioned of sheet metal or of molded plastic material. The flexible diaphragm 40 is preferably fashioned of fabric impregnated with a suitable material such as synthetic rubber to render the diaphragm impervious without impairing the flexibility thereof The diaphragm is preferably reinforced by means of a reinforced disk 52 on the inner surface and a circular member or disk 53 at the opposite surface, these components being maintained in assembled relation by a rivet or member 54 at the central region of the diaphragm. Liquid fuel from the fuel receiving chamber 38 is delivered into the restricted zone or choke band 17 of the Venturi 16 through a main or primary orifice, opening or nozzle 55, the same being the exit of a restricted passage or channel 56 which is in communication with a channel or duct 57.

The orifice 55 and associated channels or ducts provide a primary fuel delivery system for conveying fuel into the mixing passage 12. The arrangement of the invention embodies a secondary fuel delivery system. As shown in FIGURE 8, the secondary fuel delivery system includes an engine idling orifice 60 provided in the wall of the mixing passage at the engine side of the throttle valve 62, and a low speed orifice 64, said orifices 60 and 64 being in communication with a supplemental chamber or bore 65.

The throttle valve 62 is of the disk type and is mounted upon a shaft 66 journaled in bores formed in the body member 10, as shown in FIGURE 5. A manipulating arm 67 is mounted upon the shaft 66 for operating the throttle valve to control the flow of fuel and air mixture into the engine. In the arrangement illustrated in FIGURES 1 through 9, the diaphragm 40 is arranged to directly actuate a fuel inlet valve without the employment of a lever or motion multiplying means for controlling the flow of liquid fuel from a supply into the fuel receiving chamber 38.

As particularly shown in FIGURES 6 and 9, a boss portion 70 of the body 10 is bored to receive a tubular fitting 72 which is adapted to be connected by a flexible tube or hose 74 with a supply of liquid hydrocarbon fuel maintained in a fuel tank positioned above the body 10 whereby the fuel flows to the fuel inlet passage by gravity. As hereinafter described, fuel may be delivered to the fuel inlet passage in the carburetor by a fuel feeding or pumping means actuated by varying fluid pressure.

The fitting 72 is formed with a passage 76 which is in communication with a space 77 formed in the body 10. The space or bore 77 is joined with a counterbore which is threaded as shown at 78 to accommodate a threaded fitting or valve cage 79. The fitting 79 is formed with an interior bore 80, the lower end of which is fashioned with an inwardly extending ledge or flange 81. Seated in the interior of the bore 80 and against the ledge or flange 81 is an annular valve seat 82 providing an inlet port for admitting fuel into the diaphragm chamber 38.

Slidably disposed in the bore 80 is a valve body 84 fashioned with a frusto-conically shaped valve portion 86 terminating in a stem, rod portion or strut 88 adapted to be directly engaged by a head portion 54' of the rivet 54 secured to or mounted by the flexible diaphragm construction 40.

The body 84 of the inlet valve is preferably of polygonal cross-section as, for example, a triangular or square configuration to facilitate the flow of liquid fuel from the region above the valve along the facets of the valve body 84 through the port in the annular valve seat 82 and into the diaphragm or fuel chamber 38. The upper region of the valve body 84 is formed with a recess or bore to accommodate a coil spring 90 adapted to provide a small biasing force tending to seat the frusto-conically shaped valve portion 86 in the valve seat 82.

Reduced pressure set up or established in the fuel chamber 38 by aspiration or reduced pressure in the mixing passage 12 will flex the diaphragm 40 upwardly as viewed in FIGURE 6, which action through the stem 88 moves the valve portion 86 away from its seat 82 facilitating flow of liquid fuel into the chamber 38 from the supply, the extent of opening of the valve 86 being dependent upon the extent of upward flexure of the diaphragm 40 under the influence of reduced pressure in the mixing passage. The biasing force of the spring 90 tending to close the valve 86 is very slight, being merely sufficient to prevent vibration of the valve body 84 which may ensue by reason of engine vibrations. The less the amount of biasing force of the spring 90 tending to close the valve, the more sensitive the diaphragm 40 in the exercise of control of fuel flow into the chamber 38.

The seat 82 may be fashioned of synthetic rubber or other material unaffected by hydrocarbon fuels and the valve body 84, valve portion 86 and stem 88 fashioned of aluminum or other lightweight material such as a suitable plastic resin such as Delrin (a polyoxymethylene resin) in order to provide a high degree of sensitivity for the fuel inlet control means. In certain installations where engine vibration is at a minimum the biasing spring 90 may be omitted.

The arrangement for feeding liquid fuel from the diaphragm chamber 38 to the high speed or primary fuel delivery system for the main orifice 55 is illustrated in FIGURE 6. The lower end of the duct 57 is closed by means of a cap or plug 92. The carburetor body 10 is formed with a boss 94 provided with a bore 96, a portion of the wall defining the bore 96 being threaded to accommodate the threaded portion 98 of a needle valve body 100 which provides a means for regulating or metering delivery of fuel to the main orifice 55. The boss 94 is formed with a counterbore accommodating a sealing annulus 102 which is biased to sealing engagement with the valve body 100 by an expansive coil spring 103 disposed between the sealing annulus 102 and a knurled head 104 formed on the valve body or member 100.

The end of the bore 96 is in communication with the duct or passage 57 by a channel or passage 106 of comparatively small diameter. The valve member 100 is provided with a tenon portion 108 which terminates in a needle valve 110 extending into the small channel or passage 106 as shown in FIGURE 6.

The region of the bore 96 adjacent the tenon 108 on the valve member 100 is in communication with the fuel chamber 38 through a passage or channel 112.

The arrangement for feeding or delivering fuel from the chamber 38 to the engine idling orifice 60 and low speed orifice 64 is illustrated in FIGURES 7 and 8. Also formed in the boss portion 94 and spaced from the bore 96 is a second bore 116, a portion of the wall thereof being threaded to accommodate the threaded portion 117 of a valve member or body 118, as shown in FIGURE 7. The boss portion 94 is provided with a second counterbore adapted to accommodate an annular seal 120 which surrounds the valve member 118 and is biased into sealing engagement therewith by an expansive coil spring 122 disposed between the seal and a knurled head portion 123 formed on the valve body 118. A passage 124 opening into the fuel chamber 38 is in communication with the end of the bore 116 by a passage or channel 126 of comparatively small size. The valve body 118 is formed with a tenon portion 127 which terminates in a tapered valve portion or needle 128 which extends into and cooperates with the small passage 126 for controlling the flow of fuel to the secondary orifice system.

The region of the bore 116 adjacent the tenon 127 is connected with the chamber 65 by a passage or channel 130 whereby fuel flowing past the needle portion 128 into the bore 116 is conveyed by the channel 130 into the auxiliary chamber 65, fuel being delivered therefrom through the secondary orifices 60 and 64 dependent upon the position of the throttle 62 and the engine speed.

In the operation of the charge forming apparatus illustrated in FIGURES 1 through 9, the liquid fuel is delivered into the mixing passage 12, either through the main orifice 55 or the secondary orifices 60 and 64 under the influence of reduced pressure or aspiration existent in the mixing passage during engine operation. The delivery of fuel into the mixing passage is under the influence of aspiration in the mixing passage as the fuel chamber 38 is unvented. As the fuel is delivered into the mixing passage solely by aspiration or reduced pressure therein acting upon the diaphragm 40, there is no predetermined or defined fuel level in the chamber 38.

In initiating the operation of the charge forming apparatus or carburetor illustrated in FIGURES 1 through 9, the choke valve 22 is first moved to a closed or substantially closed position and the throttle valve 62 moved to an open or near open position. The engine is then cranked, setting up reduced pressure in the mixing passage 12 which is effective on the main orifice 55 to communicate the reduced pressure to the fuel chamber 38.

Reduction in the pressure in the fuel chamber 38 causes flexure of the diaphragm 40 upwardly as viewed in FIGURES 5, 6 and 9, elevating the valve member 86 through engagement of its strut 88 with the member 55 at the central region of the diaphragm, moving the valve away from its seat 82. The fuel in the supply ducts 76 and 77 flows along the facets of the valve body 84 through the port in the annular valve seat 82 into the fuel chamber 38.

The fuel is then conveyed under the influence of reduced pressure through the restricted channel 112 past the needle valve 110 into the channel 57 through the restricted passage 56 and out of the orifice 55 into the mixing passage 12. The liquid fuel thus delivered into the Venturi 16 of the mixing passage 12 is there mixed with incoming air admitted through the inlet 14 of the carburetor to form a combustible fuel and air mixture which is delivered into the engine crankcase 30.

The high speed fuel adjusting means 110 is regulated by the knurled member 104 to provide for the amount of fuel required for high speed engine operation. During the period of high speed engine operation with the throttle 62 in open or near open position, the orifices 60 and 64 of the secondary system may or may not deliver additional fuel into the mixing passage dependent upon the extent of opening of the throttle 62.

When the throttle 62 is substantially closed in engine idling position viz. the position shown in FIGURE 8, the engine idling orifice 60 is supplied with fuel from the chamber 38 through the arrangement shown in FIGURE 7. When the throttle 62 is in a partial open position or slightly away from idle position, the low speed orifice 64 comes into operation and supplies fuel in addition to the engine idling orifice 60.

The fuel supplied to the supplemental chamber 65 for discharge through the secondary orifices 60 and 64 is conveyed to the supplemental chamber through the following channels viz. the bore 124 shown in FIGURE 7 past the needle valve 128 through angularly arranged duct 130 and auxiliary chamber 65 to the secondary orifices. The fuel supplied to the secondary system, comprising the idle and low speed orifices 60 and 64, is metered or regulated by adjusting the needle valve 128 by manipulating the knurled member 123 shown in FIGURE 7.

It is found that during engine operation, a balance is maintained whereby the rate of flow of liquid fuel past the inlet valve 86, shown in FIGURES 6 and 9, is substantially equal to the rate of delivery of the fuel from the diaphragm chamber 38 into the mixing passage 12 through one or more of the orifices or outlets 55, 60 and 64.

It is essential, in order to secure satisfactory operation of the engine at idle and low speeds, to prevent reverse flow of air or air bleeding through the main orifice 55 of air from the mixing passage into the fuel to be discharged through the engine idling orifice 60, the low speed orifice 64 or both depending upon the relative position of the throttle 62 and the load on the engine.

Ball check valves or other mechanical valve means have been heretofore utilized to prevent air from the mixing passage bleeding back through the secondary fuel system when the idling or low speed fuel delivery arrangement is in operation.

A capillary or liquid seal system utilizing the capillary effect of the fuel in restricted passages or ducts is described in my Patent 2,841,372, granted July 1, 1958. The charge forming device or carburetor of the present invention utilizes the principles of the capillary or liquid seal disclosed in this patent. In the embodiment of the invention illustrated in FIGURES 1 through 9, several zones or regions of fuel restriction are provided, which together cumulate an effective seal arrangement preventing back bleeding of air through the orifice 55.

With reference to FIGURE 5, the restricted passage 56 providing the outlet or orifice 55, is of a cross-sectional area to accommodate the passage of fuel sufficient to provide a proper fuel mixture at high engine speeds. This region provides a hydraulic seal or capillary seal tending to prevent reverse flow or back bleeding of air into the duct 57 shown in FIGURE 6. The annular region surrounding the needle valve 110 in the bore or restricted passage 106 also provides a region of capillary seal.

It is found that the seal strength at the restriction provided by the needle valve 110 is highly efficient where the needle or tapered portion of the valve in the bore or restricted passage 106 is of a low included angle and the restricted passage 106 made of substantial length.

Thus the needle 110 in adjusted position provides for an annular restriction of but a few thousands of an inch surrounding the needle which, combined with a substantial length of the liquid column surrounding the needle, provides a high strength seal in addition to that provided by the restricted outlet passage 56.

The passage 112 from the diaphragm chamber 38 to the bore 96 surrounding the tenon portion 108 of valve 110 is also of comparatively small cross-sectional area, being sufficient to satisfy the maximum mixture requirements of the engine at high speeds and hence the restriction 112 provides a further region of capillary or liquid seal assisting in preventing back bleeding of air through the orifice 55.

Hence in the arrangement as shown in FIGURE 6, the restricted outlet passage 56, the annular region surrounding the needle valve 110 in the restricted passage 106 and the passage 112 provide three regions of liquid or capillary seals wherein the capillary action of the fuel is effective up to certain pressures to provide valve means effective in preventing back bleeding of air through the main orifice 55. It is found by test that the seal strength for carburetors, embodying a Venturi having a choke band or region up to approximately three-quarters of an inch, is maintained effective under a pressure which will support a column of water approximately one inch in height, as pointed out in my Patent 2,841,372.

The seal strength varies approximately inversely to the size of the Venturi and increasing the Venturi size tends to promote a seal of lesser strength.

It is to be noted that for satisfactory operation the capillary seal strength of the seal regions, when the engine is operating in the low speed range, must be greater than the pneumatic force or aspiration required to cause flexure of the diaphragm.

It should be noted that the fuel chamber 38 is shallow and is arranged as close as practicable to the mixing passage 12 to reduce the distance through which the fuel must be lifted for discharge into the mixing passage. When the carburetor is in a so-called normal position, that is, with the mixing passage disposed above the diaphragm 40, the height of fuel between the level of the fuel in the chamber 38 and the outlet orifice 55 opening into the Venturi functions as a negative head and resists or tends to retard fuel flow through the main orifice or nozzle 55 into the mixing passage.

The carburetor or charge forming apparatus illustrated in FIGURES 1 through 9 is of the so-called "free" position carburetor as it is adaptable for operation in extreme angular and inverted positions. When used in an inverted position, in the absence of a fuel pump or means for delivering fuel under low pressure other than gravity, the fuel tank must be maintained with the fuel supply level above the carburetor in order to assure operation. In the capillary seal arrangement, it should be noted that the idle fuel supply is at the inlet side of the high speed fuel restriction. Such arrangement provides ample supply of fuel to the idle system yet the capillary seal at the main nozzle and the high speed adjusting restriction prevents back-bleeding of air through the nozzle 55.

The spring 90, biasing the valve 86 toward its seat 82, should be proportioned to provide low pressure to normally maintain the valve 86 in closed position and prevent the valve from the influence of engine vibrations and avoid uncontrolled flooding of the carburetor. As the flexure of the diaphragm is controlled by the aspiration or reduced pressure in the mixing passage, it is therefore desirable to maintain the lowest possible practicable pressure of the spring 90 upon the valve 86 in order that the diaphragm be responsive to a minimum of aspiration or reduced pressure rendering the diaphragm sensitive to minute variations in pressure.

Operation of the charge forming apparatus or carburetor at a pressure just slightly below atmospheric pressure in the fuel chamber 38 is essential in order to avoid rupture or breakage of the liquid or capillary seal in the main fuel delivery system during engine idling or low speed engine operation. A pressure which will support a column of water three sixteenths of an inch in height effective on the diaphragm 40 is usually sufficient to overcome the spring 90, the weight of the valve 86 and the low hydraulic force on the valve 86 to open the valve to admit fuel to the chamber 38.

It is found that the liquid or capillary seal is maintained effective to prevent back bleeding with various sizes of Venturi having a choke band or restricted region up to a diameter of approximately an inch.

Variation in the strength of the liquid or capillary seal is dependent in a measure upon the sizes of the orifices and fuel passages required for calibration in adapting the charge forming apparatus or carburetor to different engines, temperature conditions and variations in the ratio of the amount of lubricating oil to liquid fuel where oil is added to the fuel for use in operating engines of the two cycle type.

The strength of the liquid or capillary seal has been found to be consistent and dependable and may be relied upon as an effective liquid check valve to prevent back bleeding of air through the main discharge orifice into the secondary fuel delivery system when the latter is in operation. The provision of a shallow chamber 38 reduces to a minimum the amount of fuel in the diaphragm chamber 38 and hence a minimum of weight of fuel on the diaphragm, rendering the diaphragm highly sensitive to small variations in pressure in the mixing passage.

FIGURE 10 illustrates a modified form of valve construction for controlling the admission of fuel into the fuel chamber 38. In this form the diaphragm 40', valve guide fitting 79' and the inlet connection fitting 72' are of the same construction as illustrated in the form of carburetor of FIGURES 1 through 9. Seated upon the ledge 81' of the fitting or guide 79' is an annular inlet valve seat 135 which is preferably fashioned with a central opening of slightly larger diameter than the opening in the valve seat 82 shown in FIGURE 9.

A valve 137 formed of spherical or ball shape is disposed adjacent the valve seat 135 in the bore 84' formed in the valve guide 79' and is of a diameter slightly less than the diameter of the bore 84' in order to facilitate flow of liquid fuel around the ball valve 137. An expansive coil spring 139 is provided, one end engaging the ball valve 137, the other end seating in a recess 140 formed within the carburetor body 10.

The spring 139 biases the ball valve 137 toward closed position in engagement with the seat 135. The pressure of the spring being very slight so that a small reduced pressure in the fuel chamber 38 acting on the diaphragm is required to control the ball valve 137. The rivet construction 142 mounted at the central region of the diaphragm is provided with an upwardly extending strut or pin 144, the distal end of which is arranged adjacent the ball valve 137 and is adapted, upon upward flexure of the diaphragm 40', to elevate the ball above its seat and open the port in the valve seat 135.

When pressure is increased in the fuel chamber 38, the diaphragm 40' is flexed in the opposite direction, permitting the valve 137 to close the port in the valve seat 135 under the influence of the fuel head and spring bias. In this manner an efficient control is exercised over the fuel flow into the fuel chamber 38 dependent upon the rate of discharge of the fuel through the main orifice or the engine idling and low speed orifices.

FIGURE 11 is illustrative of a modified form of reinforcement for the diaphragm. The diaphragm 148, shown in FIGURE 11, is reinforced at its central region by a circular disk like member 150 which is fashioned of comparatively thin sheet material such as aluminum, substantially rigid plastic material such as Delrin, the latter being a resin, polyoxymethylene, which is bonded by a compatible cementitious material providing a lightweight reinforcement for the central region of the diaphragm 148.

The diaphragm construction shown in FIGURE 11 may be utilized in the form of construction illustrated in FIGURES 1 through 9 as the strut or stem 88 on the valve member 86 may directly engage the disk 150 during flexure of the diaphragm 148.

FIGURES 12 through 21 illustrate a form of charge forming apparatus embodying fuel feeding means, the charge forming apparatus having a fuel flow control diaphragm acting directly upon a fuel inlet valve, the fuel feeding means including a diaphragm pumping or pulsing means for delivering fuel to the charge forming component enabling the positioning of a fuel supply tank below the charge forming apparatus. The arrangement shown in FIGURES 12 through 21 comprises an association of components, as in the construction shown in FIGURES 1 through 9, providing for the capillary or liquid seal in the primary fuel delivery system to prevent back bleeding of air into the secondary system when the latter is in operation.

The arrangement is inclusive of a carburetor body or body member 160, of the same general shape or contour as the body 10 illustrated in FIGURES 1 through 4, formed with a mixing passage 162 which embodies a Venturi 163 having a choke band or restricted region 164. The air inlet region 165 of the body 160 is provided with a shaft 166 which supports a disk type choke valve 167 for use in starting the engine with which the construction is utilized. The mixture outlet region 168 is provided with a throttle shaft 169 to which is secured a disk type throttle valve 170 for controlling the flow of air and fuel mixture to the engine.

The mixture outlet end of the body is provided with a flange 172 adapted to be secured to the crankcase 173 of a two cycle engine by means of bolts 174. The choke shaft 166 and throttle shaft are provided respectively with manipulating arms 176 and 177.

The body member 160 is formed with a shallow recess or fuel chamber 38', a flexible diaphragm 40' extending across and forming a flexible wall of the fuel chamber 38'. A second member or plate 180 is arranged adjacent the diaphragm 40' and is formed with a cavity or recess 182 to accommodate flexing movements of the diaphragm 40'.

As in the form of the invention shown in FIGURES 1 through 9, the charge forming apparatus shown in FIGURES 12 through 19 is provided with a primary fuel delivery system and a secondary delivery system for conveying fuel into the mixing passage to be therein mixed with air to form a combustible mixture.

The primary fuel delivery system includes a fuel discharge outlet or orifice 55' opening into the choke band or zone or restriction 164 of the Venturi 163. The main orifice 55' is in communication with a duct 57' by a restricted passage 56', the end of the duct 57' adjacent the fuel chamber 38' being closed by a plug 92'.

A boss 94' on the body member 160 is formed with a threaded bore 96' which receives a threaded portion 98' of a valve body 100'. The boss 94' is fashioned with a counterbore accommodating a sealing ring 102', a coil spring 103' being disposed between the sealing ring and a knurled head 104' on the valve body 100'. The bore 96' is in communication with the duct 57' by a restricted passage 106', the valve body 100' having a reduced tenon portion 108' terminating in an elongated tapered needle valve 110' extending into and cooperating with the restricted passage 106' to regulate the rate of fuel delivery to the main orifice 55.

The bore 96' is in communication with the fuel chamber 38' by a restricted passage 112'. By manually adjusting the valve body 100', the rate of fuel delivery to the main orifice 55 may be varied by the relative position of the needle valve 110' in the restricted passage 106'.

The secondary fuel delivery system is inclusive of an engine idling orifice or outlet passage 180 and a low speed passage or orifice 182 shown in FIGURE 17, the passages 180 and 182 being in communication with a duct or supplemental chamber 184 extending substantially parallel with the axis of the mixing passage. The end of the duct 180 in the mounting flange 172 is closed by a plug 185.

When the throttle valve 170 is in closed position, the low speed orifice or passage 182 is rendered substantially ineffective to deliver fuel as it is at the Venturi side of the throttle valve. As shown in FIGURE 16, the boss portion 94' is formed with a second bore 116' threaded to receive the threaded portion 117' of a valve body 118', a second counterbore accommodating a sealing ring 120' and an expansive coil spring 122' disposed between the sealing ring and the knurled head 123' on the valve body 118'.

The supplemental chamber 184 is in communication with the bore 116′ by a restricted passage 126′ into which extends a long tapered needle valve portion 128′ formed on a reduced tenon portion of the valve body 118′. The bore 116′ is adapted to receive fuel from the chamber 38′ through a restricted passage 186. The charge forming arrangement illustrated in FIGURES 12 through 19 embodies the capillary or liquid fuel seal system associated with the high speed fuel delivery arrangement.

The passage 56′ terminating in the outlet or orifice 55′, the restricted passage 112′ and the annular region surrounding the tapered needle valve 106′ provide sealing regions wherein the capillary action of the fuel is effective to prevent or resist back bleeding of air through the main orifice 55′ into the secondary fuel delivery system comprising orifices 180 and 182. The strength of the liquid or capillary seals is effective at pressures up to approximately that pressure which will support a column of water approximately one inch in height.

The lift factor whereby fuel is aspirated into the mixing passage through the orifices at engine idling or low speed positions of the throttle is below the rupturing pressure of the capillary seal. In certain installations it may be desirable to provide for a small amount of air bleeding into the fuel in the duct 57′ so that an emulsion is aspirated into the mixing chamber through the main orifice 55′. For this purpose a restricted air bleed passage 188 may be provided at the air inlet region of the Venturi 163 and the duct or passage 57′ as shown in FIGURE 17.

In this form of the invention, fuel flow into the diaphragm or fuel chamber 38′ is controlled by a valve arrangement of the same character as illustrated in FIGURE 9. With particular reference to FIGURE 19, the fuel inlet valve construction is inclusive of a valve guide or fitting 79′ threaded into a bore formed in the body member 160. The fitting 79′ is formed with a ledge 81′ which positions an annular valve seat member 82′ within the interior bore 80′ in the fitting.

Slidably disposed in the bore 80′ is a valve body 84′ having a frusto-conically shaped valve portion 86′ which terminates in a downwardly extending strut or pin portion 88′ adapted to be engaged by the head of a rivet or member 54′ mounted by the diaphragm 40′. The body portion 84′ of the valve 86′ is of polygonal cross-section providing facets along which fuel may flow when the valve is moved away from the annular seat 82′. The strut or stem portion 88′ of the valve construction is of lesser diameter than the port in the seat 82′ to facilitate fuel flow into the diaphragm chamber 38′.

The body portion 84′ of the valve is bored to receive a coil spring 90′ which exerts a slight bias on the valve member tending to engage the valve portion 86′ with the valve seat to close the port. Reduced pressure transmitted through the fuel delivery orifices and channels from the mixing passage 162 causes flexure of the diaphragm 40′ toward the mixing passage and as the diaphragm directly influences the valve portion 86′, the latter will be moved away from its seat permitting fuel flow past the valve into the chamber 38′ for delivery into the mixing passage.

The rate of fuel flow into the chamber 38′ is dependent upon the mixture requirements of the engine, and variations in velocity of the air through the mixing passage vary the aspiration effective to flex or actuate the diaphragm 40′. The chamber or space 77′ at the upper end region of the fitting 79′ is supplied with liquid fuel through a channel 190 to which fuel is supplied by a fuel feeding arrangement. Secured to the member 180 is a member 192 which forms a component of a fuel feeding or pumping means.

The member 180 is formed with a recess or cavity 193 and the member 192 is formed with a recess or cavity 194. Extending across these cavities and between the members 180 and 192 is a second or pumping diaphragm 196 formed of flexible impervious material. The member 192 is formed with a circular recess 198 accommodating a gasket 199.

Fitted into the recess 198 is a cover or closure member 200 which seats against the gasket 199 to form a fluid tight joint. The central region of the member 192 is formed with a boss 201 formed with a threaded bore to receive a bolt 202, the latter extending through an opening in the closure 200 for securing the closure to the member 192.

An annularly shaped fuel strainer or filter 204 extends across the annular recess 205 in the member 192. The recess or cavity at one side of the pumping diaphragm 196 forms a pumping or pulse chamber 193, the diaphragm 196 being adapted to be operated by a source of varying fluid pressure, and where the construction is used with an engine of the two cycle type, the varying pressure in the engine crankcase is utilized as the varying pressure source.

As particularly shown in FIGURE 20, the member 180 is formed with a channel 206 which is in registry with a channel 208 formed in the member 160. The channel 206 is in communication with the pumping chamber 193 by means of a connecting channel 209. A channel 210 in communication with channel 208, extends through the mounting flange 172 and is arranged for registry with a passage or channel 212 formed in the boss portion on the crankcase providing a mating mounting means for the mounting flange 172.

A bushing or member 214 formed with a restriction or passage 215 of small cross-sectional area may be employed in the channel 210 where it is desired to vary the restriction. The size of the restriction 215 in the member 214 may be varied to modify the effectiveness of the reduced pressure in flexing or setting up a pumping action of the pumping diaphragm 196.

The channel 208 is in communication with the outlet region 168 of the mixing passage by means of a restricted channel or vent passage 216 for a purpose hereinafter explained.

The cavity 194 at the opposite side of the pumping diaphragm 196 provides a fuel receiving compartment, the volume of which is varied by flexure of the pumping diaphragm 196, and is arranged to receive fuel from a supply tank or reservoir (not shown). The member 192 is provided with an inlet port 218, shown in FIGURE 17, and an outlet port 220, shown in FIGURE 18. As shown in FIGURE 21, the pumping diaphragm 196 is formed with an inlet flap valve portion 222 and an outlet flap valve portion 224.

The valve portions 222 and 224 are integrally formed of the material of the diaphragm by cutting away U-shaped portions of the diaphragm to provide the spaces 225 and 226 to facilitate movement of fuel adjacent the flap valves as they are alternately opened and closed. The valves 222 and 224 are adapted to hinge or flex about the linear region of their integral juncture with the major area of the diaphragm as shown in FIGURE 21. The inlet valve 222 cooperates with the port 218 in FIGURE 17 and the flap valve 224 cooperates with the outlet port 220 shown in FIGURE 18.

The outlet port or passage 220 in member 92 is in communication with the fuel compartment 194 by means of a channel 228. The inlet port or passage 218 is in communication with the space 205 above the filter 204 through a passage 230 shown in FIGURE 15, the fuel passing the inlet flap valve 222 when the same is open, the fuel flowing through passage 232 and 234 into the fuel receiving compartment 194, shown in FIGURES 16 and 17.

Formed in member 180 is a channel 236 which registers with a channel 237 formed in the body member 160, the channel 237 being in communication with the angular channel 190, shown in FIGURES 18 and 19, to facilitate delivery of fuel under the pressure provided by the action of the pumping diaphragm 196 to the fuel inlet valve arrangement shown in detail in FIGURE 19. The closure member 200 is formed with an elbow shaped portion 240 adapted to accommodate a flexible tube 242 adapted to be connected with a fuel tank or other fuel supply.

The elbow shaped portion 240 is provided with a fuel inlet passage 244, shown in FIGURE 15, to convey fuel from the tubular member 242 into the space defined by an inner surface of the closure 200 and through the filter or strainer 204 into the space 205. When the engine is in operation, the varying reduced pressure set up in the engine crankcase is transmitted to the pumping chamber 193 through the connecting or intercommunicating channels 209, 206, 208, 210 restriction 215 and passage 212, shown in FIGURE 20, so that a pumping action is set up or exerted by the varying pressure upon the pumping diaphragm 196 causing rapid movements or flexure of the diaphragm.

This pumping action or movement of the diaphragm influences flow of liquid fuel through the fuel receiving compartment 194. During an opening movement of the inlet flap valve 222 when the diaphragm 196 is flexed in one direction, liquid fuel flows from the space 205 through the channel 230 and port 218 past the inlet flap valve 222 and through channels 232 and 234 into the fuel receiving compartment 194.

When the inlet flap valve is closed and the outlet valve 224 is opened, under the influence of movement of the diaphragm 196 in the opposite direction, fuel flows through channel 228 and port 220, shown in FIGURE 18, past the outlet valve 224, through the mating channels 236 and 237, thence through channel 190 to the region 77′ above the inlet valve 86′, shown in FIGURE 19.

In this manner there is always a supply of fuel under comparatively low pressure at the region of the fuel inlet control valve 86′ so that upon upward flexure of the metering diaphragm 40′, when fuel requirements of the engine are increased, the valve 86′ is elevated by direct action of the diaphragm 40′ and fuel flows past the valve 86′ into the diaphragm or fuel chamber 38′ thence through either the primary or secondary fuel delivery systems, dependent upon engine speed and load conditions, into the mixing passage 162 in the manner hereinbefore described.

It is to be understood that the pulsation or pressure variation in the engine crankcase effects a corresponding pulsation or flexure of the pumping diaphragm 196. The restriction 215 in the pulse line in communication with the pumping chamber enables a regulation or control of the pumping effectiveness of the pumping diaphragm 196. Thus if a comparatively low fuel pressure is desired in the fuel compartment 194 and adjacent the inlet control valve 86′, the restriction 215 may be made comparatively small.

If higher fuel pressure is desired, the restriction may be enlarged to secure increased pumping flexure or movement of the pumping diaphragm within the limits of pressure provided by the crankcase pulsations. The vent passage 216 shown in FIGURE 20 between the pulse channel 208 and the outlet region of the mixing passage 168 may be employed as additional means for reducing or controlling the effectiveness of the pressure pulsations transmitted to the pumping chamber 193. In a two cycle engine, the crankcase usually contains wet fuel and air mixture and some fuel may enter the pulse channels or passages 210, 208, 206 and 209.

Through the use of the vent passage 216, wet fuel which may enter the pulse channels is bled into the mixing passage through the vent opening 216. The vent opening 216 if increased in size will decrease the effectiveness of the pulse pressure transmitted to the pumping diaphragm. Through the proper correlation of the respective sizes of the restriction 215 and the vent passage 216, the fuel pressure developed by the pumping diaphragm may be varied or controlled by regulating the effectiveness of the variable fluid pressures or forces acting upon the pumping diaphragm 196.

It will thus be seen that the fuel feeding and charge forming arrangement illustrated in FIGURES 12 through 20 provides a unit embodying a metering diaphragm arranged for direct action upon the fuel inlet valve in conjunction with a fuel feeding arrangement in which the fuel pressure developed by the fuel feeding arrangement may be effectively regulated and controlled and wherein the components are compactly arranged to occupy comparatively small space and which comprises a minimum number of parts.

This form of the invention provides a position free carburetor and fuel feeding arrangement which is operable in extreme angular positions of tilt and in inverted position as fuel is supplied under pressure to the inlet valve control means irrespective of the relative position of the fuel tank or fuel supply and wherein fuel flow ceases upon stopping the engine with which the arrangement is employed.

The control of the pumping forces acting upon the pumping diaphragm 196 through the utilization of the restricted passage 215 and the vent passage 216, shown in FIGURE 20 is particularly important in the arrangement wherein the metering diaphragm 40′ acts directly upon the fuel inlet control valve 86′. In order to render the metering diaphragm 40′ sensitive to minute variations in pressure existent in the mixing passage, the pressure on the fuel above the inlet valve 86′ should be kept as low as possible so that the metering diaphragm will be responsive to minute reduced pressure or low aspiration in the mixing passage to open the fuel inlet valve 86′.

By proper proportioning of the size of the restriction 215 and vent passage 216 the effective variable pressure influence the pumping diaphragm 196 may be controlled and and thereby maintain the pressure on the fuel at the inlet valve 86′ to a minimum commensurate with practical operation of the charge forming apparatus.

FIGURES 22 and 23 illustrate a modified form of charge forming and fuel feeding apparatus of the general character of the arrangement shown in FIGURES 12 through 21 but incorporating or embodying a multiple Venturi construction in the mixing passage. In this form, the body or body member 250 is formed with a mixing passage 251 which includes a main or primary Venturi 253 having a choke band or zone of maximum restriction 254. The mixing passage includes an air inlet 255 and a mixture outlet 256, a choke valve 167a in the air inlet and a throttle valve 170a in the mixture outlet 256.

The secondary fuel delivery system, including an idling orifice 180a, a low speed orifice 182a and associated channels and fuel metering adjustment are the same as in the form of construction illustrated in FIGURES 12 through 21. The arrangement includes a shallow fuel or diaphragm chamber 38a, a metering diaphragm 40a, a member 180a adjacent the metering diaphragm, a pumping diaphragm 196a and a member 192a adjacent the pumping diaphragm, these components being held in assembled relation by screws 195a.

The fuel feed or fuel pumping arrangement illustrated in FIGURES 22 and 23 is the same as that illustrated in the form shown in FIGURES 12 through 20 and the fuel inlet valve mechanism shown in FIGURE 23 is of the same construction as that shown in FIGURE 19. The fuel inlet valve is slidably contained within a valve cage or fitting 79a, the stem 88a of the valve adapted to be engaged by the member 54a mounted at the central region on the metering diaphragm 40a. A closure member 200a, provided with the fuel entrance elbow 240a, is secured to member 192a by a bolt 202a.

The incoming fuel is filtered or strained through a screen 204a. The pumping diaphragm 196a is actuated by varying fluid pressure derived from the engine crankcase of a two cycle engine through intercommunicating channels arranged as shown in FIGURE 20. Positioned centrally in the Venturi 253 is a supplemental or second Venturi 258 having a choke band or region of maximum restriction 260. In the form shown in FIGURES 22 and 23 the primary and secondary Venturis 253 and 258 are arranged on a common axis viz the axis of the mixing passage.

The outer wall 262 of the supplemental or secondary Venturi is of circular shape, as shown in FIGURE 23 and is integrally joined with the body 250 by a connecting or bridge portion 264. The fuel delivery system for high speed operation is substantially the same as that shown in FIGURE 15 except that the main orifice 55a opens into or discharges fuel into the choke band 260 of the supplemental or secondary Venturi 258. The fuel passage 56a for the orifice 55a opens into a duct 57a.

A high speed adjusting needle valve 110a cooperates with a restricted passage 106a to regulate or meter the fuel delivered through the main orifice 55a. The bore, containing the valve body 98a provided with the needle valve 110a, receives fuel from the fuel chamber 38a through a restricted passage or channel 112a. The multiple Venturi construction, shown in FIGURES 22 and 23, enables the delivery of a satisfactory fuel and air mixture particularly when an engine is operating at low speeds under comparatively heavy loads.

This advantage is attained by reason of the increase or amplification of the aspiration effective on the main nozzle 55a in the supplemental Venturi 258. As the aspiration on the main fuel delivery orifice 55a is appreciably greater for a comparable air flow due to the utilization of the supplemental Venturi, the capillary seal regions provided by the restricted passage 56a, the annular region surrounding the needle valve 110a and the restricted passage 112a may be proportionately reduced in area and obtain a satisfactory seal.

Since the annular space surrounding the long slender needle valve 110a may be adjusted to a lesser area because of the increased aspiration on the main fuel orifice 55a, the strength of the capillary seal at this region is increased and hence requiring a greater differential in pressure before it is fracture or ruptured.

It is desirable to employ a valve 110a which is fashioned as a long slender needle of low taper as it provides for a long annular region of fuel, providing increased effectiveness of the capillary action and hence the strength of the liquid seal.

The restricted passages 56a and 112a also have acumulative effect on the seal strength. These passages should therefore be of a minimum cross-sectional area commensurate with their capacity to convey fuel to the outlet orifice 55a to satisfy the requirements of the engine at its maximum speed.

FIGURES 24 and 25 illustrate a modified form of the carburetor and fuel feed system shown in FIGURES 22 and 23. In this form the components corresponding with like components in FIGURES 22 and 23 are of the same construction with the exception of the charge forming body 280. The body 280 is formed with a main or primary Venturi 253b having a choke band or zone of maximum restriction 254b, the Venturi forming a component of the mixing passage 251b. The mixing passage is provided with a choke valve 167b and a throttle valve 170b.

The carburetor body 280 is formed with a shallow fuel chamber 38b, one wall of which is defined by a metering diaphragm 40b held in place by a member 180b. A pumping diaphragm 196b is associated with a member 192b, a closure 200b provided for the fuel compartment in the member 192b in the same manner as shown in FIGURE 23. The secondary fuel delivery system including the secondary orifices 180b and 182b and associated channels are the same as in the other forms of the invention.

In this form, a supplemental or secondary Venturi 282 is integrally formed with the body member 280 and is disposed in a region of the mixing passage 251b at one side of the axis of the mixing passage in the region nearest the fuel chamber 38b.

As will be apparent in FIGURES 24 and 25, the axis of the supplemental Venturi 282 is offset from the axis of the mixing passage and main Venturi 253b. The supplemental Venturi 282 is provided with a choke band or region of restriction 284 and the main fuel discharge orifice 55b opens into the choke band 284 of the supplemental Venturi.

By disposing the supplemental Venturi as close as practicable to the fuel chamber 38b, that is, in the side of the mixing passage closest to the chamber 38b, less pressure or aspiration is required to effectively discharge or deliver fuel through the main orifice 55b into the supplemental Venturi. This reduction in the lift factor enables fuel to be delivered into the supplemental Venturi at appreciably lower air flow through the mixing passage. The fuel conveying passages 56b, 112b and the annular space surrounding the metering needle 110b provide the capillary seal features in this form as in the other forms hereinbefore described.

While there may be some tendency toward stratification of the fuel in the mixing passage due to the offset position of the supplemental Venturi 282 due to enrichment of the mixture on the lower side or region of the supplemental Venturi, such condition has no appreciable effect upon the engine as the air and fuel become thoroughly mixed in the crankcase of the two cycle engine by reason of turbulence therein and when used with the four cycle engine there is substantial turbulence in the combustion chamber of the engine which promotes uniform distribution of the fuel in the fuel and air mixture.

The arrangement shown in FIGURES 24 and 25, providing a high lift factor for delivering fuel from the main orifice into the supplemental Venturi, enables the use of the arrangement in larger capacity carburetors without sacrificing the advantages of the capillary seal for preventing back bleeding of air through the main orifice into the secondary fuel delivery system when one or more orifices of the secondary system are in operation.

FIGURES 26 through 34 illustrate a modified form of charge forming and fuel feeding apparatus of the invention. In this form, the main or primary fuel delivery system and the secondary delivery system, the fuel chamber and metering diaphragm acting directly upon a fuel inlet valve mechanism, are substantially the same as the corresponding components of the form of the invention illustrated in FIGURES 1 through 9.

This form of the invention includes a body member 300 formed with an air and fuel mixing passage 302, the mixing passage including a Venturi 303 having a choke band or region of restriction 304. The mixing passage is provided with an air inlet region 306, and a mixture outlet region 307. The outlet end of the body member 300 is provided with a mounting flange 308 for connecting the body member with the crankcase of an engine. The intake region 306 is equipped with a shaft 166c provided with a choke valve 167c, the mixture outlet region being provided with a shaft 169c equipped with a disk-type throttle valve 170c.

The body 300 is formed with a shallow recess providing a fuel chamber 38c, a metering diaphragm 40c extending across the recess and forming a flexible wall of the chamber 38c. A cover member 310 is provided for the metering diaphragm 40c and the cover member secures the peripheral region of the diaphragm in contact with the body member 300 by screws 312. The central region of the cover member 310 is recessed providing a space 314 to accommodate flexure of the diaphragm 40c, the space 314 being vented to the atmosphere through an opening 315.

The body 300 is formed with a bore adapted to receive a valve guide or fitting 79c in which is slidably mounted a valve body 84c having a frusto-conically shaped valve portion 86c adapted to cooperate with an annular valve seat 82c disposed in a lower portion of the fitting 79c in the manner illustrated in FIGURE 29, a spring exerting a slight bias on the valve 86c tending to seat the valve. The end region of the valve member is provided with a strut or pin 88c which is adapted to be engaged by the member or rivet 54c mounted at the central region of the diaphragm 40c.

The axis of the valve member 86c is at substantially the central region of the metering diaphragm 40c. The upper end of the bore accommodating the valve guide or fitting 79c is in communication with a fuel inlet passage 318. The aspiration or reduced pressure in the mixing passage 302 is communicated through the fuel channels to the chamber 38c, the variable pressures effecting flexure of the metering diaphragm 40c to influence the position of the valve 86c to control fuel flow into the diaphragm chamber 38c.

The primary or high speed fuel delivery system includes a main orifice 55c opening into the choke band 304 of the Venturi 305, a restricted passage 56c conveying fuel to the orifice from a fuel duct 57c. The body is formed with a boss portion 94c which has a threaded bore accommodating a manually operable valve body 98c formed at its extremity with a long tapered needle valve portion 110c extending into and cooperating with a restricted passage 106c, the valve body being formed with a knurled head 104c for manually adjusting the position of the needle valve.

A restricted passage 112c conveys fuel from the chamber 38c to the region of the bore in the boss 94c adjacent the needle valve 110c, the latter being adjustable to regulate the fuel flow or delivery from the main or primary orifice 55c. The restricted passages 56c and 112c and the annular fuel space surrounding the needle valve 110c provide restricted regions for the formation of capillary seals in the manner hereinbefore described in reference to the other forms of the invention to prevent back bleeding of air from the mixing passage through the main nozzle into the secondary fuel delivery system when the latter is in operation.

The secondary fuel delivery system, shown in FIGURE 30, includes an engine idling orifice 180c, a low speed orifice 182c these orifices being in communication with a passage or supplemental chamber 184c extending generally parallel with the axis of the mixing passage, the end of the passage being closed by a plug 185c.

As shown in FIGURE 31, the passage 184c is in communication by means of a restricted passage 126c into which extends an elongated needle valve 128c formed on the end of a valve body 118c threaded into a bore formed in the boss portion 94c.

The valve body 118c is provided with a knurled head portion 123c for adjusting the position of the needle valve 128c to regulate fuel flow to the secondary orifices 180c and 182c. The region of the bore adjacent the needle portion 128c is in communication with the fuel chamber 38c by a fuel duct or passage 186c. As in the other forms of the invention, the valve member 118c regulates the fuel flow from the chamber 38c to the secondary orifices 180c and 182c.

A restricted air bleed passage 188c may be provided in communication with the air inlet region 306 and the fuel duct 57c to bleed air into the fuel for delivery into the mixing passage through the main orifice 55c. When either or both of the secondary orifices 180c and 182c are delivering fuel into the mixing passage, the capillary or liquid seals provided in the restricted passages 56c, 112c and the annular region surrounding the needle valve 106c prevents back bleeding of air from the mixing passage through the orifice 55c into the secondary fuel delivery system as hereinbefore explained in connection with the form of the invention shown in FIGURES 1 through 9.

The fuel feeding or pumping means is arranged at a region spaced from the metering diaphragm 40c. As shown in the drawings the metering diaphragm arrangement, in the normal position of the carburetor body, is at the bottom or beneath the mixing passage and the pumping or fuel feeding arrangement is disposed above the mixing passage. The body member 300 is formed with a boss portion 320 above the mixing passage provided with a cavity or recess 322 which forms a pumping or pulse chamber. Extending across the cavity 322 is a flexible pumping diaphragm 324, a cover plate or member 326 securing the periphery of the diaphragm to the body member 300 by screws 328.

The cover plate 326 is provided with a recess or cavity 330 at the opposite side of the pumping diaphragm 324. The chamber 322 forms a pumping or pulse chamber which is in communication with the crankcase of an engine of the two cycle type, the variable fluid pressure in the crankcase effecting rapid flexure or reciprocation of the pumping diaphragm 324 to effect a pumping action in the fuel chamber 330. Formed in the body 300, as shown in FIGURE 32, is a pulse passage 332 in communication with the pulse or pumping chamber 322.

The pulse passage 332 extends through the mounting flange 308 and registers with an opening into the crankcase of a two cycle engine. Mounted in the extremity of the pulse passage 332 adjacent the mounting flange is a member, sleeve or bushing 334 provided with a restriction or restricted passage 335 for controlling the effective pumping effort of the variable fluid pressure upon the pumping diaphragm 324.

A vent opening 336 is in communication with the pulse passage 332 and the mixture outlet region 307 of the mixing passage and serves to bleed off any wet fuel or mixture which may enter the pulse passage 332 through its communication with the engine crankcase. The vent opening 336 also assists in controlling the effective pumping action of the pumping diaphragm 324 supplementing the control provided by the restricted passage 335.

As the metering diaphragm 40c directly acts upon the valve 86c, it is desirable that the pumping pressure developed in the fuel compartment 330 be held to a minimum consistent with practical operation in order that the upward flexure of the diaphragm 40c controlling the fuel inlet valve 86c be influenced by comparatively low lift pressure or low aspiration existent in the mixing passage 302. The member or plate 326 is provided with a bore snugly receiving the tenon portion of a nipple or coupling 340 which is adapted to be connected by means of a tube 341 with a fuel tank or fuel supply.

The passage 342 in the nipple 340 is in communication with a port 344, shown in FIGURE 30, which is provided with a flap valve 346 formed as an integral part of the pumping diaphragm 324 and is of the character illustrated in FIGURE 21. The space 348 shown in FIGURE 30 and formed in the body 300 providing clearance for movement of the flap valve 346 is connected by a passage 350 with the fuel compartment 330 whereby fuel is conveyed through the passage in the nipple 340 past the flap valve 346 and into the fuel compartment 330.

As shown in FIGURE 34, the fuel compartment 330 is formed with an outlet port in communication by means of a passage 352 with an outlet port 345. A flap valve 356, formed integrally with the pumping diaphragm 324, cooperates with the port 354 to facilitate passage of liquid fuel from the fuel compartment 330 through port 354 past the valve 356 and into the passage 318 adjacent the diaphragm controlled fuel inlet valve 86c. The flap valve 356 is of the configuration illustrated in FIGURE 21.

Thus under the variable fluid pressure impulses transmitted through the pulse passage 332 to the pulse or pumping chamber 322, the pumping diaphragm 324 is rapidly flexed in alternate directions, and through the cooperation of the flap valves 346 and 356, fuel is pumped from the supply connected with the nipple 340 through the fuel compartment 330 into the passage 318 and is admitted into the diaphragm fuel chamber 38c past the valve 86c under the influence of flexure of the diaphragm effected by aspiration or reduced pressures in the mixing passage 302.

By varying the area of the restriction 335 and the size of the vent opening 336 an effective control may be exercised over the amplitude of pumping strokes of the pumping diaphragm 324 and thereby control the amount of fuel pressure set up in the fuel passage 318.

While the metering diaphragm 40c and the pumping diaphragm 324 as shown in FIGURE 29 are disposed at opposite regions of the mixing passage 302 and are arranged in substantial parallelism, it is to be understood that the position of the pumping diaphragm may be modified and arranged in a plane at an angle to the plane of the metering diaphragm 40c.

However in practical operation it is found advantageous to position the diaphragms in substantial parallelism to minimize the effect of vibrations of an engine on the diaphragms as the planes of the diaphragms may be maintained in substantial parallelism with directions of engine vibrations. It should be noted that the fuel feeding and charge forming apparatus illustrated in FIGURES 26 through 34 is of the free position type and is operable in extreme angular or inverted positions, rendering the construction suitable for chain saws, lawnmowers or in any installation subject to extreme angular positions.

FIGURE 35 illustrates a modified form of venting means for the chamber adjacent the diaphragm cover. In this form the body 360 is provided with a mixing passage 362 including an air inlet passage 364 and a Venturi 366. The main orifice 55d opens into the choke band or restricted region of the Venturi and receives its fuel from a duct 57d connected with the fuel chamber 38d in a manner hereinbefore described in reference to the other forms of the invention. The air inlet 364 is provided with a choke valve 167d mounted upon a shaft 166d. The metering diaphragm 40d forming a flexible wall for the chamber 38d is secured to the body 360 by a cover plate 368.

The cover plate is provided with a channel 370 registering with a channel 372 formed in the body 360 which is in communication with an angularly arranged tube member 374 opening into the air inlet region 364. The passage provided by the channels 370 and 372 and the tubular member 374 forms a venting means for the chamber 380. A venting means or pressure balancing channel of this character may be used where an air cleaner associated with the air inlet 364 may offer appreciable resistance to air flow which may tend to increase the flow of fuel through the main orifice 55d.

It is apparent that, within the scope of the invention, modifications and different arrangements may be made other than as herein disclosed, and the present disclosure is illustrative merely, the invention comprehending all variations thereof.

I claim:

1. In combination, a charge forming and fuel feeding apparatus including a body member formed with a mixing passage, a throttle valve in said passage, a fuel chamber in said body member, a first diaphragm forming a wall of the fuel chamber, a fuel inlet passage in the body member, a fuel inlet valve for said inlet passage, resilient means normally biasing the fuel inlet valve toward closed position, means mounted by said first diaphragm arranged to directly engage and actuate said valve by flexing of the said diaphragm, means establishing pressure on the fuel in the inlet passage including a second diaphragm, a fuel compartment, a pulsing chamber, said second diaphragm forming a common wall of said compartment and pulsing chamber, means including a channel connecting the pulsing chamber with a source of varying fluid pressure for actuating said second diaphragm, inlet and outlet ports for the fuel compartment, valve means for said inlet and outlet ports, and venting means for said channel in communication with said mixing passage.

2. In combination, a charge forming and fuel feeding apparatus including a body member formed with a mixing passage, a throttle valve in said passage, a fuel chamber in said body member, a first diaphragm forming a wall of the fuel chamber, a fuel inlet passage in the body member, a fuel inlet valve for said inlet passage, resilient means normally biasing the fuel inlet valve toward closed position, means mounted by said first diaphragm arranged to directly engage and actuate said valve by flexing of the said diaphragm, means establishing pressure on the fuel in the inlet passage including a second diaphragm, a fuel compartment, a pulsing chamber, said second diaphragm forming a common wall of said compartment and pulsing chamber, means including a channel connecting the pulsing chamber with a source of varying fluid pressure for actuating said second diaphragm, inlet and outlet ports for the fuel compartment, valve means for said inlet and outlet ports, a restriction in said pulsing channel, and venting means for said channel in communication with the mixing passage.

3. In combination, a body formed with a mixing passage, a throttle valve in said passage, said mixing passage including a main Venturi, a comparatively small supplemental Venturi in said mixing passage and having its axis parallel to and offset from the axis of the main Venturi, a recess formed in the body, a diaphragm forming with said recess a fuel chamber, a main orifice opening into the supplemental Venturi, a fuel inlet passage in said body including a valve chamber; fuel inlet valve means in said chamber including a valve seat, a valve, and means biasing said valve against said valve seat; means mounted on the center of said diaphragm for direct engagement with said fuel inlet valve means for controlling flow of liquid fuel into the fuel chamber, and channel means arranged to convey fuel from the fuel chamber to the main orifice, the axis of said fuel inlet valve means being offset with respect to the bore of said mixing passage, said diaphragm having its center coincident with the axis of said fuel inlet valve means and offset with respect to the bore of said mixing passage, said inlet valve means and said diaphragm being positioned closely adjacent said mixing passage, whereby the offsetting and the positioning of said diaphragm and said valve means closely adjacent to said mixing passage, reduces the size of the charge forming and fuel feeding apparatus to afford more sensitive control of delivery of fuel into said mixing passage.

4. In combination, a body formed with a mixing passage, a throttle valve in said passage, said mixing passage including a main Venturi, a comparatively small supplemental Venturi in said main Venturi and having its axis parallel to and offset from the axis of the main Venturi, a recess formed in the body, a diaphragm forming with said recess a fuel chamber, a main orifice opening into the supplemental Venturi, a secondary orifice opening into the mixing passage at a region space from the main orifice, a fuel inlet passage in said body including a valve chamber; fuel inlet valve means in said chamber including a valve seat, a valve, and means biasing said valve against said valve seat; means mounted on said diaphragm for direct engagement with said fuel inlet valve means for controlling flow of liquid fuel into the fuel chamber, and channel means between the orifices and the fuel chamber to convey fuel from the fuel chamber to the main and secondary orifices, the channel means between the main orifice and the fuel chamber being formed with a restricted region for establishing a liquid fuel seal to prevent air flow from the main passage through the main orifice when the secondary orifice is delivering fuel into the mixing passage, the axis of said fuel inlet valve means being offset with respect to the bore of said mixing passage, said diaphragm having its center coincident with the axis of the fuel inlet valve means and offset with respect to the bore of said mixing passage, said inlet valve means and said diaphragm being positioned closely adjacent said mixing passage, whereby the offsetting and positioning of said diaphragm and said valve means closely adjacent to said mixing passage reduces the size of the charge forming and fuel feeding apparatus to afford more sensitive control of delivery of fuel into said mixing passage.

5. In combination a charge forming and fuel feeding apparatus including a body member formed with a mixing passage having a main Venturi therein, means for conveying fuel to said mixing passage, a throttle valve in said passage, said body member having a fuel chamber formed therein, a first diaphragm forming a wall of the fuel chamber, a fuel inlet passage in said body member including a fuel chamber; fuel inlet valve means in said chamber including a valve seat, a valve, and means biasing said valve against said valve seat; means mounted on said first diaphragm for direct engagement with said fuel inlet valve means for transmitting movements of said first diaphragm to said fuel inlet valve means, a comparatively small supplemental Venturi in said mixing passage and having its axis parallel to and offset from the axis of the main Venturi in a direction toward the fuel chamber, the axis of said supplemental Venturi being between the axis of said main Venturi and said fuel chamber; means establishing pressure of the fuel in the inlet passage including a second diaphragm, a fuel compartment, and a pulsing chamber; said second diaphragm forming a common wall of said compartment and said pulsing chamber, means including a channel connecting said pulsing chamber with a source of varying fluid pressure for actuating said second diaphragm, inlet and outlet ports for the fuel compartment, fuel valve means for said inlet and outlet ports, the axis of said first mentioned fuel inlet valve means being offset with respect to the bore of said mixing passage, said first diaphragm having its center coincident with the axis of said first mentioned fuel inlet valve means and offset with respect to the bore of said mixing passage, said first mentioned fuel inlet valve means and said first diaphragm being positioned closely adjacent said mixing passage, whereby the offsetting and positioning of said diaphragm and said valve means closely adjacent to said mixing passage reduces the size of the charge forming and fuel feeding apparatus to afford more sensitive control of delivery of fuel into said mixing passage.

6. In combination, a body formed with a mixing passage, a throttle valve in the mixing passage, said mixing passage including main and supplemental Venturies, said Venturies being located within the cylinder defined by the bore of said mixing passage, a shallow recess formed in said body, a fuel metering diaphragm forming with said recess a fuel chamber, a main orifice opening into the supplemental Venturi, a secondary orifice opening into the mixing passage at a region spaced from the supplemental Venturi, a fuel inlet passage in said body including a valve chamber, valve means in said valve chamber including a valve seat, a valve, and means biasing said valve against said valve seat; means mounted on the center of said diaphragm to directly engage and actuate said fuel inlet valve means by flexing of said diaphragm; channel means arranged to convey fuel from the fuel chamber to the main and secondary orifices, and a restriction between the main orifice and the fuel chamber for establishing a liquid capillary seal to prevent air flow from the mixing passage through the main orifice when the secondary orifice is delivering fuel into the mixing passage, the axis of said fuel inlet valve means being offset with respect to the bore of said mixing passage, said diaphragm having its center coincident with the axis of said fuel inlet valve means and offset with respect to the bore of said mixing passage, said inlet valve means and said diaphragm being positioned closely adjacent said mixing passage, whereby the offsetting and positioning of said diaphragm and said valve means closely adjacent to said mixing passage reduces the size of said charge forming and fuel feeding apparatus to afford more sensitive control of delivery of fuel into said mixing passage.

7. In combination, a charge forming and fuel feeding apparatus including a body member formed with a mixing passage, means for conveying fuel to said mixing passage, a throttle valve in said passage, a fuel chamber in said body member, a first diaphragm forming the wall of said fuel chamber, a fuel inlet passage in the body member including a valve chamber, fuel inlet valve means in said chamber including a valve seat, a valve, and means biasing said valve against said valve seat; means mounted on the center of said first diaphragm to directly engage and actuate said fuel inlet valve means by flexing of said diaphragm; means establishing pressure on the fuel in the inlet passage including a second diaphragm, a fuel compartment, and a pulsing chamber; said second diaphragm forming a common wall of said compartment and pulsing chamber, means including a channel connecting the pulse chamber with a source of varying fluid pressure for actuating said second diaphragm, inlet and outlet ports for the fuel compartment, and valve means for said inlet and outlet ports, the axis of said first mentioned fuel inlet valve means being offset with respect to the bore of said mixing passage, said first diaphragm having its center coincident with the axis of said first mentioned fuel inlet valve means and offset with respect to the bore of said mixing passage, said first mentioned inlet valve means and said first diaphragm being positioned closely adjacent said mixing passage, whereby the offsetting and positioning of said diaphragm and said first mentioned valve means reduces the size of said charge forming and fuel feeding apparatus to afford more sensitive control of delivery of fuel into said mixing passage.

8. In combination, a charge forming and fuel feeding apparatus including a body member formed with a mixing passage, a throttle valve in said passage, a fuel chamber in said body member, a diaphragm forming a wall of said fuel chamber, a main orifice opening into said mixing passage, a secondary orifice opening into said mixing passage at a region spaced from said main orifice, a fuel inlet passage in said body including a valve chamber; fuel inlet valve means in said chamber including a valve seat, a valve, and means biasing said valve against said valve seat; means mounted on said diaphragm arranged for direct engagement with said fuel inlet valve means for controlling flow of liquid fuel into said fuel chamber, channel means between the orifices and the fuel chamber to convey fuel from the fuel chamber to the main and secondary orifices, said channel means between the main orifice and the fuel chamber being formed with a restricted region for establishing a liquid fuel seal to prevent air flow from the mixing passage through the main orifice when the secondary orifice is delivering fuel into said mixing passage, the axis of said fuel inlet valve means being offset with respect to the bore of said mixing passage, said diaphragm having its center coincident with the axis of said fuel inlet valve means and offset with respect to the bore of said mixing passage, said inlet valve means and said diaphragm being positioned closely adjacent said mixing passage, whereby the offsetting and positioning of said diaphragm and said inlet valve means closely adjacent said mixing passage reduces the size of said charge forming and fuel feeding apparatus to afford more sensitive control of delivery of fuel into said mixing passage.

References Cited in the file of this patent

UNITED STATES PATENTS

| | | |
|---|---|---|
| 2,680,605 | Bracke | June 8, 1954 |
| 2,724,584 | Armstrong | Nov. 22, 1955 |
| 2,764,996 | Brown | Oct. 2, 1956 |
| 2,774,582 | Bracke | Dec. 18, 1956 |
| 2,777,456 | Ey | Jan. 15, 1957 |
| 2,796,838 | Phillips | June 25, 1957 |
| 2,801,621 | Anderson et al. | Aug. 6, 1957 |
| 2,823,905 | Brown | Feb. 18, 1958 |
| 2,827,272 | Phillips | Mar. 18, 1958 |
| 2,841,372 | Phillips | July 1, 1958 |
| 2,918,082 | Pinke | Dec. 22, 1959 |